May 4, 1954  A. R. CLARK  2,677,251
FRONT MOUNTED TRUCK REFRIGERATION UNIT
Filed Oct. 15, 1951  3 Sheets-Sheet 1

Inventor:
Adna R. Clark
Paul O. Pippel
Atty.

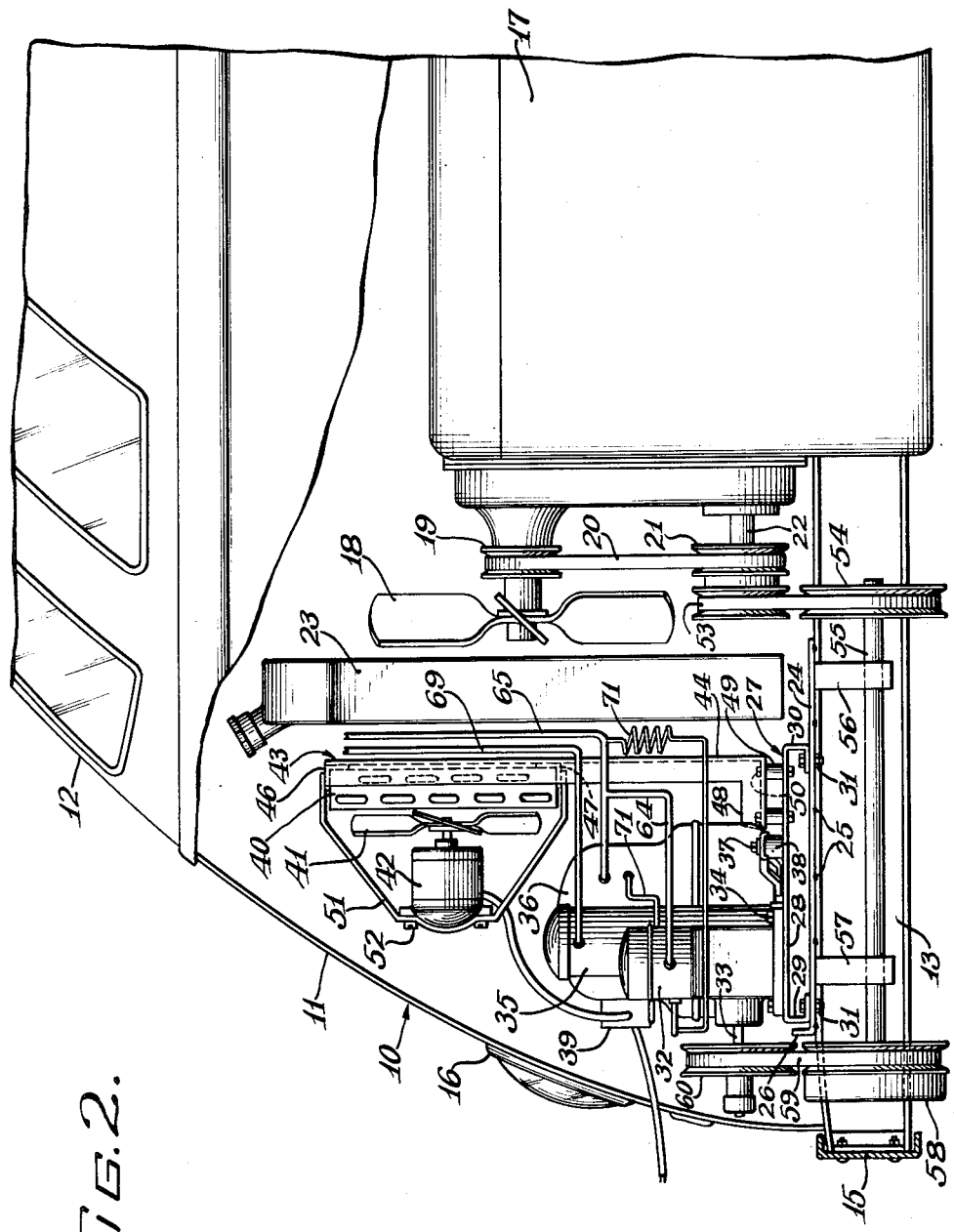

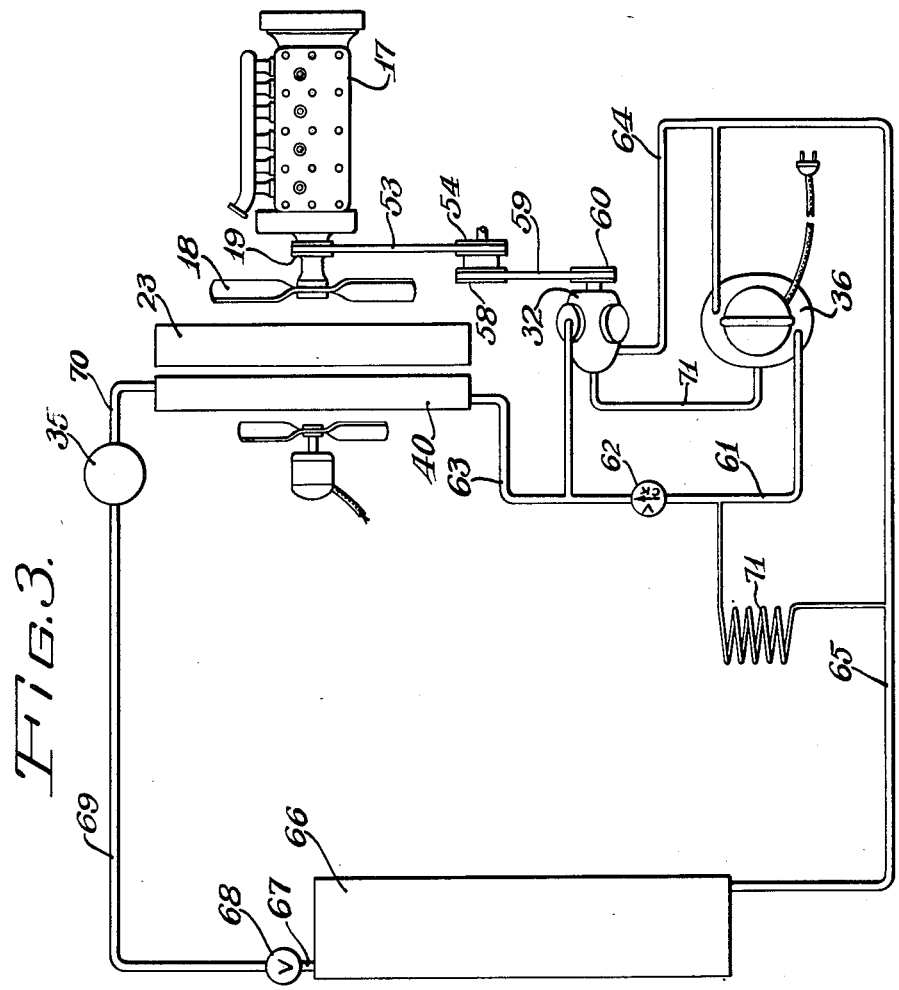

Patented May 4, 1954

2,677,251

UNITED STATES PATENT OFFICE 2,677,251

FRONT MOUNTED TRUCK REFRIGERATION UNIT

Adna R. Clark, Evansville, Ind., assignor to International Harvester Company, a corporation of New Jersey Application October 15, 1951, Serial No. 251,341

9 Claims. (Cl. 62—117.1)

This invention relates to refrigerating apparatus and, more specifically, is concerned with an improved arrangement of refrigerating apparatus in an automotive vehicle.

The increase in recent years of the use of frozen food products, and of food products requiring refrigeration during the time such products are being transported or delivered to the retailer or consumer, has brought about an increased demand for the installation of some form of mechanical refrigerating apparatus in the smaller automotive trucks presently used for this purpose. As a consequence, many forms and varieties of mechanical refrigerating units have been installed, particularly in the smaller delivery-type of automotive vehicle usually employed for such distribution. In order to facilitate handling in traffic, as well as for reasons of operational economy, most of the vehicles used for such purposes are relatively small and compactly built; and frequently are provided with a very low floor level in order to reduce operator fatigue. Excess or unused space in such vehicles is usually extremely limited and consequently the installation of refrigerating apparatus therein has provided many difficult problems, which have, heretofore, been resolved in many different ways but without any universally accepted degree of satisfaction.

In some prior installations, for instance, a portion of the cargo-carrying space in the food storage compartment was utilized to contain a compactly arranged, vertically stacked refrigeration unit, but despite the fact this unit operated reasonably well it occupied valuable cargo-carrying space and thus presented a very formidable objection to its further extensive use. In other instances the refrigerating apparatus was separated, i. e., not mounted as a unit, and portions thereof were disposed beneath the vehicle hood adjacent the engine while other portions were located beneath the vehicle body. This type installation was found to be objectionable because it greatly complicated repair or servicing of the various components of the refrigerating apparatus as well as those of the motor vehicle proper. Still further applications are known to involve the installation of the refrigerating apparatus as a compact unit disposed beneath the truck. Such latter installations are particularly unsuitable in the smaller vehicles that are characterized by a low floor level, but are likewise generally objectionable in a majority of modern trucks where small road clearances are provided.

The presently proposed invention envisages a vastly improved arrangement and disposition of the refrigerating apparatus in a refrigerated truck that readily overcomes such objections as have heretofore been encountered in connection with the use of apparatus of this character, and, as a result thereof, greatly facilitates and encourages the installation and use of such apparatus in the smaller sized motor trucks. The proposed arrangement accomplishes such improvement, and overcomes the failings and shortcomings of many prior truck refrigerating units, because it effectively utilizes a hitherto unused, although readily available, space for positioning and containing the refrigerating apparatus without encroaching on any of the cargo-carrying space and without reducing the load-carrying capacity of the vehicle.

It is a principal object, therefore, of this invention to provide a novel and improved arrangement for incorporating refrigerating apparatus in a motor truck.

A further object is to provide for mounting refrigerating apparatus in the space delimited by a motor vehicle's radiator and its forward ornamental grille thereby facilitating the servicing and replacement of such apparatus.

Another object is to provide an improved and simplified arrangement for supplying power from the engine of a vehicle for operating a refrigerant compressor.

A still further object is to provide an improved arrangement for providing stand-by operation in a refrigerated truck.

A yet still further object is to provide an improved means, including an hermetic motor-compressor, for providing stand-by operation in a refrigerated truck.

Another important object is to provide improved unloading means for equalizing high and low side refrigerant pressures in a hermetic stand-by compressor when utilized with truck refrigerating apparatus.

A further important object is to provide an improved arrangement for increasing the operating efficiency of refrigerating apparatus installed in a refrigerated motor vehicle.

The foregoing and other objects and features of the invention will become apparent as the disclosure is more fully made in the following detailed description of a preferred embodiment of the invention as illustrated in the accompanying drawings in which:

Fig. 2 is a cut-away side elevational view that shows a portion of the front end of a motor truck having refrigerating apparatus supportably positioned in the space between the vehicle's radiator and front ornamental grille as proposed in the present invention.

Fig. 3 is a schematic layout of the proposed refrigerating apparatus, connecting fluid conduits, and power take-off driving connections for the compressor thereof.

Figure 1:
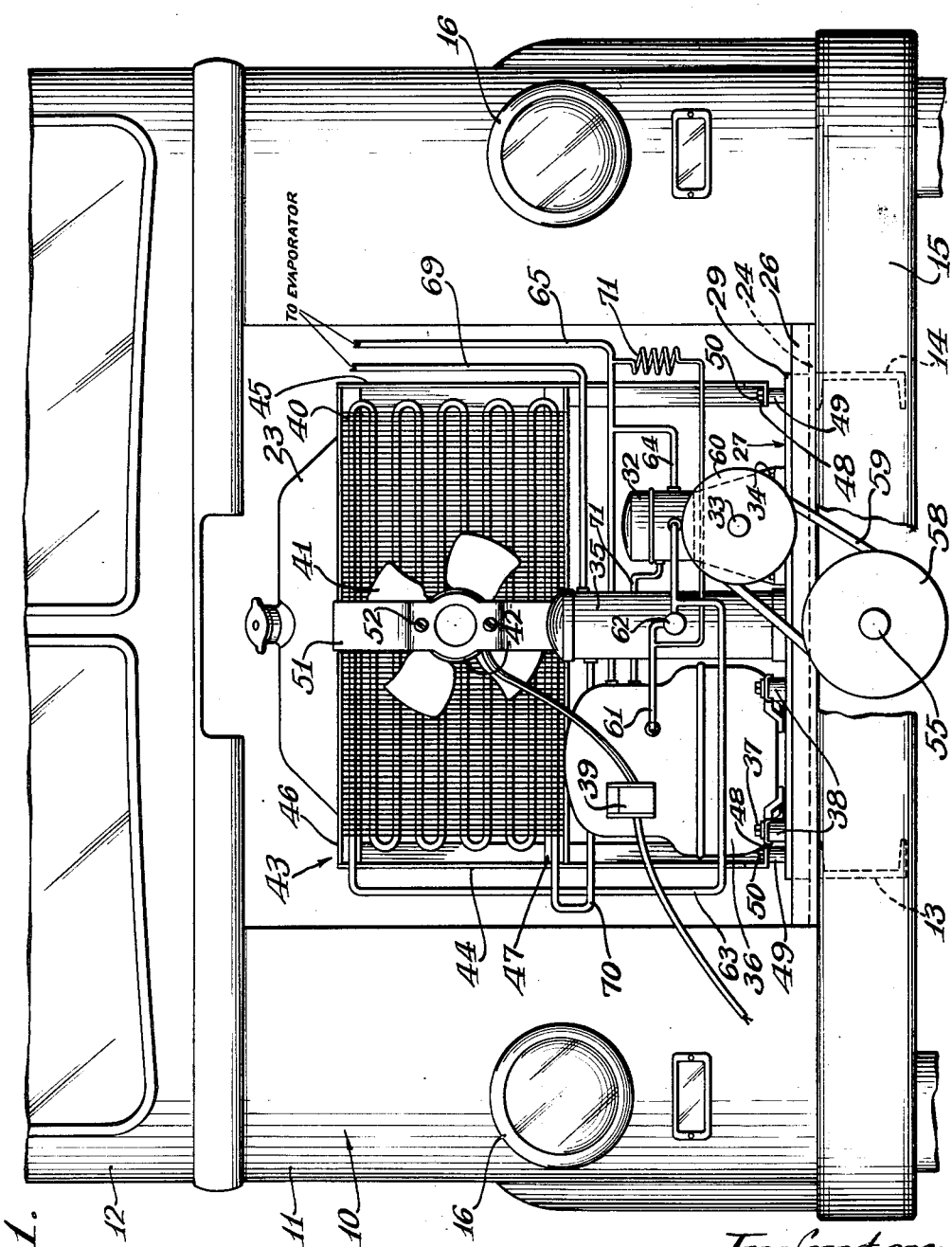
Fig. 1 is an elevational view, with the front ornamental grille work removed, of a portion of the front end of a motor vehicle that shows the disposition and arrangement of refrigerating apparatus installed in accordance with the present invention.

For the purpose of illustrating a preferred embodiment of the proposed invention a delivery-type multiple stop motor truck was selected as the vehicle into which refrigerating apparatus, preferably, is installed, and the arrangement and disposition of such apparatus therein is more fully described hereinafter. Delivery vehicles of this type are usually characterized by low-floor level compartments, for both the operator and cargo, and are generally arranged so that the operator may either stand or be seated while driving. Usually, also, the body thereof extends out and over the front wheels, radiator and engine so that the conventional top-opening hood ordinarily provided to cover the engine and adjacent components is unnecessary. The present invention, however, is not limited to a motor vehicle of this specific type, but is equally applicable to any motor truck having sufficient available space between the vehicle's radiator and ornamental front grille in which to install the desired refrigerating apparatus.

Referring now, more particularly, to the attached drawings it will be noted that portions of the front end of a delivery-type vehicle are represented as including a forward vertical wall 10 having a lower panel section 11 that joins an upper or windshield supporting portion 12. The truck body is suitably supported on and affixed in conventional fashion to longitudinal side frame members 13 and 14, which are transversely spaced and connected together at their forward end by a rigid bumper member 15. Headlights suitably supported in said lower body panel are indicated generally by the numeral 16. Motive power for the vehicle is provided by the internal combustion engine 17 (a portion only of which is shown), and a fan 18, connected to pulley 19 and driven by means of a belt 20, in turn, connected through the double pulley 21 with the drive shaft 22, functions to move or circulate air over the engine in conventional fashion. The vehicle radiator, indicated by the numeral 23, is shown as positioned in front of the engine in conventional fashion and, as is well understood in the art, is suitably fixedly supported on the vehicle chassis frame. The components of the vehicle thus far described and their arrangement therewithin are generally conventional, hence further detailed description thereof is believed unnecessary.

A supporting panel-like member 24, preferably, is positioned over the longitudinal frame members 13 and 14 and affixed, by any suitable means such as the spot welds 25, to the upper surfaces thereof, and the forward edge of said panel, may, if desired, be provided with an upwardly turned reinforcing flange 26. Said panel is adapted to support a C-shaped base member 27 which includes a central mounting section 28 and opposite edge sections having L-shaped flanges 29 and 30 depending therefrom. The flanges 29 and 30 function to space the base above the support panel 24 while the horizontal legs thereof may additionally be utilized to affix the base to said support by means of the nut and bolt assembly 31. The refrigerating apparatus may be mounted on said base member as hereinafter noted. A conventional upright-type of refrigerant compressor 32, provided with a forwardly extending drive shaft 33, is fixedly mounted on the base 27, by suitable means such as the nut and bolt assembly 34, while closely adjacent and to one side thereof there is mounted a receiver tank 35 which, for space conservation reasons, is preferably disposed upright. Adjacent one side of said receiver is an additional compressor, indicated generally by the numeral 36, which, likewise may be affixed to the base 27 by suitable nut and bolt means 37. The compressor 36 is of the hermetic type wherein an electric driving motor is coupled to a compressor and the resulting unit is hermetically sealed in a common casing. Interposed between the casing of said hermetic compressor and the base 27 is a resilient bushing 38, of rubber or like material, which operates to reduce the noise and dampen the vibrations of said compressor. The electrical connection or junction box 39 for the compressor 36 may be mounted on and affixed to the outer casing thereof as indicated.

For the purpose of supporting the refrigerant condenser 40, and its associated cooling fan 41 and electric driving motor 42, in spaced relation over said base and above the heretofore mentioned refrigerating apparatus there is provided a frame structure 43 which, in turn, is fixedly supported on said base. Said frame may include a pair of transversely spaced and vertically disposed angle side members 44 and 45 which are connected together at their top end by a transverse angle-like member 46, and at approximately their mid-point by another angle member 47. One end of each of said side members is turned outwardly to provide a footing-like flange 48 which is arranged to rest on one or more resilient spacer bushings 49, of rubber or the like, and to be further secured to said base member by suitable bolt and nut means 50. The condenser is fixedly positioned within the upper portion of said frame which, in turn, is positioned proximate to and forward of the vehicle radiator whereby the cooling capacity of said condenser may benefit from being in the path of the air stream that passes through and cools said radiator while the vehicle is in motion, or while the vehicle is at rest and the vehicle's engine and fan are operating. The condenser fan motor 42 may be fitted to a bracket-like brace or supporting member 51 by suitable screw means 52, while the bracket, in turn, is fixedly secured to the transverse frame members 46 and 47.

When the vehicle's engine is operating, motive power for the refrigerant compressor 32 is obtained through a power take-off mechanism connected with said engine, which mechanism will presently be described in detail, but when the vehicle's engine is not operating, such for instance as when the vehicle is parked over night or the like, the standby hermetic motor-compressor 36 is utilized to circulate refrigerant through the refrigerating apparatus and electric power supplied from any convenient electrical outlet may be used to operate said hermetic compressor.

The power take-off mechanism originates at the drive shaft 22, of the engine 17, where a double-tracked or grooved pulley is arranged with one belt 20 drivingly connected to the engine fan pulley 19, while another belt 53 on said pulley connects with the pulley 54 mounted on one end of a jackshaft 55, which, in turn, is supportably positioned, by means of journalling brackets 56 and 57, beneath the support member 24. Fixedly mounted on the opposite end of said jackshaft is a conventional adjustable effective-pitch-diameter V-pulley 58 that is drivingly connected by an endless V-belt 59 with a complementary adjustable V-pulley 60 mounted for rotation therewith on the drive shaft 33 of the upright compressor 32. The adjustable variable speed-ratio pulleys 58 and 60, preferably, are of the conventional expansible V-pulley type wherein the effective pitch diameter of the driving pulley 58 is centrifugally motivated and governed by the speed of the driving shaft to which it is affixed, and the effective pitch diameter of the driven pulley 60, the two halves of which are usually spring biased toward one another so as to constantly urge them together to provide the largest effective diameter, adjusts to follow the lead, and the variations in speed, of the driving pulley thereby functioning to maintain said driven pulley at substantially a constant speed even though the speed of the driving pulley varies from time to time in consonance with the speed of the vehicle's engine. Since devices of this character are generally old, and the operation thereof is so well understood in the art, it is believed any further detailed description thereof is unnecessary. A typical example of the type of adjustable pulleys utilized herein may be found in my co-pending application, Serial No. 228,298, entitled Centrifugally Controlled Variable Speed V-Belt Power Transmission.

The arrangement of refrigerant conducting conduits for hydraulically connecting the various components of the refrigerating apparatus together deviates somewhat from the conventional because herein lies some of the additional specific features of the present invention. As best seen in the schematic diagram of Fig. 3, this includes a conduit 61 which connects the discharge outlet of the hermetic compressor 36, through a conventional one-way check valve 62, with the discharge outlet of the upright compressor 32, while an extension 63 of said conduit connects with one side of the condenser 40. Another conduit 64 connects the suction side of the upright compressor 32 with the suction inlet of the hermetic compressor 36, while an extension 65 of said conduit connects with the discharge or suction side of the evaporator cooling unit 66. The opposite or inlet side of said evaporator is connected by a conduit 67 to an expansion valve 68, in turn, connected by conduit 69 with the receiver tank 35 whose opposite inlet is connected by conduit 70 to the discharge side of the condenser 40 to complete the refrigerant carrying circuit which, of course, will be filled with a suitable refrigerant and sealed therein in accordance with common trade practices for such systems.

The evaporator cooling unit 66 and expansion valve 68 have been shown diagrammatically in the drawing of Fig. 3 but since they will be positioned in the food storage compartment in the rearward portion of the truck they have not been otherwise included in the other drawings which show only portions of the front end of a motor truck. Since the construction of the rearward portion of the vehicle and of the refrigerated food storage compartment therein, as well as the evaporator and expansion valve, is generally conventional it was felt no further need for illustration of these parts herein was necessary.

A lubricating oil equalizing conduit 71 has been provided for connecting the two compressors together so that proper lubrication of these units may be obtained regardless of which compressor may be in operation at any particular time.

A bleeder conduit, preferably in the form of a small diametered capillary tube 71, is connected between the high pressure side conduit 61 and the low pressure side conduit 65 for the purpose of unloading the hermetic compressor 36 during idle periods and thus equalize the high and low side pressures therein so that substantially less torque will be required for starting said compressor. This feature is of particular importance in a truck refrigeration unit because the capacity of the hermetic compressor's self-contained electric driving motor is quite generally limited by the dimensions of said compressor's casing, which, in turn, is further limited by the small area into which such unit must be confined when mounted in the front end of a motor vehicle in accordance with the present invention.

In operation the proposed refrigerating apparatus is basically conventional insofar as the refrigeration cycle is concerned. For instance, when the vehicle engine is operating the upright compressor 32, being operatively connected through the power take-off mechanism with said engine, functions to compress refrigerant and force it by way of conduit 63 into the condenser 40 where the necessary heat is extracted therefrom before it is passed by way of conduit 70 into the receiver tank 35. From said receiver tank the refrigerant is passed through conduit 69 into the expansion valve 68 and then into the evaporator cooling unit 66 where it functions to extract heat from the food storage compartment before flowing back by way of conduit 65 to the suction inlet of the compressor to complete the cycle. Even though the check valve 62 is arranged so as to pass refrigerant therethrough in the direction indicated by the arrow on Fig. 3 the pressure of the refrigerant returning from the evaporator 66, by way of conduit 65, will not be sufficient to force refrigerant past the capillary 71 and through valve 62 because of the high discharge pressure of compressor 32 on the opposite side of said valve, hence all refrigerant exhausted from the evaporator will be returned to the suction inlet of said compressor. On the other hand, when the vehicle engine is at rest and compressor 32 is idle, the hermetic compressor 36 may be placed in operation by merely connecting the electric motor therein to a suitable source of electric power supply. In this case refrigerant will be forced through conduit 61, valve 62, and conduit 63 into the condenser 40. From the opposite side of said condenser the flow will be through conduit 70, receiver 35, conduit 69, expansion valve 68, evaporator cooling unit 66, and conduit 65 back to the suction inlet of said hermetic compressor to complete the refrigeration cycle. Since compressor 32 is inoperative at this time the pressure against check valve 62 will be substantially reduced and thus it will offer no appreciable resistance to the flow of refrigerant therethrough from the hermetic compressor. Although a small amount of refrigerant may be by-passed, by way of the parallel circuit through the capillary 71 and conduit 65, back into the suction inlet when the hermetic compressor is operating, the quantity of refrigerant thus diverted will not be sufficient to appreciably affect the operation of the refrigeration system. Upon termination of operation of said hermetic compressor the check valve 62 will close and refrigerant may slowly bleed through the capillary 71 and conduit 65 back into the suction inlet of the compressor and thus eventually equalize pressure on the high and low sides thereof so that upon restarting this compressor a minimum of starting torque will be required to overcome the residual pressure retained in the system.

The oil equalizing or distributing conduit 71 operates in conventional fashion to distribute lubricating oil between two or more refrigerant compressors when employed in a multiple type of operation thereby insuring sufficient lubrication for each compressor during its running time.

From the foregoing it will now be apparent that a new and novel arrangement for accommodating refrigerating apparatus, particularly in a small delivery motor truck, has been illustrated and described. It will also be appreciated that the proposed new arrangement and disposition of such apparatus greatly simplifies any servicing thereof, and additionally simplifies the servicing of the vehicle engine and its associated components because of the absence of the refrigerating apparatus which, heretofore, was frequently positioned so close to the engine as to obstruct access thereto and interfere with any work being performed thereon. Furthermore, positioning the refrigerating apparatus forward of the vehicle's engine and radiator has been found to increase its operating efficiency by virtue of better and more efficient cooling which is obtainable for the apparatus in such forwardly exposed position. The proposed power take-off provided for driving the refrigerating apparatus from the vehicle engine is greatly simplified and the absence of all complicated and costly clutching mechanisms, for disconnecting the engine-driven compressor during operation of the stand-by compressor, further simplifies the construction thereof as well as of the overall refrigerating apparatus. Such a simple and effective power take-off mechanism also greatly enhances the adaptability of a refrigeration unit to a motor truck. On the other hand, the utilization of an hermetic compressor for standby purposes further simplifies the construction and arrangement of the individual components and permits greater utilization of the limited space generally available for the installation of refrigerating apparatus.

While only one form of the invention has been shown, it will be obvious to those skilled in the art that it is not so limited, but susceptible of various changes and modifications without departing from the spirit thereof, and it is desired, therefore, that only such limitations shall be placed thereupon as are specifically set forth in the appended claims.

What is claimed is:

1. In a refrigerated automotive vehicle having transversely spaced and longitudinally extending chassis frame members, and a water cooling radiator disposed forwardly of a driving engine in the forward portion of a vehicle, the combination, comprising: a base member disposed forwardly of the vehicle radiator and supported by the chassis frame members; refrigeration apparatus, including a first refrigerant compressor, a second and separate refrigerant compressor, a receiver tank, a condenser and fluid conducting conduits connected therebetween, supported on said base member; means, including a variable speed-ratio mechanism, for operatively connecting said first compressor with the vehicle engine for driving engagement therewith during the time of engine operation; and having said second compressor an hermetic-type unit with a self-contained electric driving motor adapted for operation, upon connection with a source of electric power supply, as a stand-by when said first compressor is inoperative.

2. In a refrigerated automotive vehicle having transversely spaced and longitudinally extending chassis frame members, and a water cooling radiator disposed forwardly of a driving engine in the forward portion of a vehicle, the combination, comprising: refrigeration apparatus, including a first refrigerant compressor and a second refrigerant compressor, supported on the chassis frame members proximate one end thereof and forwardly of the vehicle radiator; means, including a variable speed-ratio mechanism, for operatively connecting said first compressor with the vehicle engine for driving engagement therewith; said second compressor being of the hermetic type having a self-contained electric driving motor adapted to operate upon connection with a source of electrical power supply; a pair of fluid conducting conduits connecting together the high pressure portions and the low pressure portions, respectively, of said compressors; and a one-way check valve adapted for installation in said high pressure conduit whereby said first compressor may be operated when said second compressor is at rest.

3. In a refrigerated automotive vehicle having transversely spaced and longitudinally extending chassis frame members, and a water cooling radiator disposed forwardly of a driving engine in the forward portion of the vehicle, the combination, comprising: a base member disposed forwardly of the vehicle radiator and supported by the chassis frame members; refrigeration apparatus, including a first refrigerant compressor, a second refrigerant compressor, a receiver tank, a condenser and fluid conducting conduits connected therebetween, supported on said base member; means, including a variable speed-ratio mechanism, for operatively connecting said first compressor with the vehicle engine for driving engagement therewith during the time of engine operation; said second compressor being of the hermetic-type with a self-contained electric driving motor adapted for operation, upon connection with a source of electric power supply, as a stand-by when said first compressor is inoperative; said fluid conducting conduits including a pair of conduits connecting together the high pressure portions and the low pressure portions, respectively, of said compressors; and a one-way check valve adapted for installation in the conduit connecting the high pressure portions of said compressors, whereby said first compressor may be operated when said second compressor is at rest.

4. In a refrigerated automotive vehicle having transversely spaced and longitudinally extending chassis frame members, and a water cooling radiator disposed forwardly of a driving engine and positioned in the forward position of a vehicle, the combination, comprising: a base member disposed forwardly of the vehicle radiator and supported by the chassis frame members; a frame structure uprightly positioned on said base; refrigeration apparatus, including a first refrigerant compressor, a second refrigerant compressor and a receiver tank, supportably mounted on said base; a refrigerant condenser adapted for positioning within the frame structure proximate one end thereof and being disposed in spaced relation above said base; fluid conducting conduits connecting said apparatus and condenser including a pair of conduits connecting together the high pressure portions and the low pressure portions, respectively, of said compressors; means, including a variable speed-ratio mechanism, for operatively connecting said first compressor with the vehicle engine for driving engagement therewith during operation of the engine; said second compressor being of the hermetic-type with a self-contained electric driving motor adapted for operation, upon connection with a source of electric power supply, as a stand-by when said first compressor is inoperative; and a one-way check valve adapted for installation in the conduit connecting the high pressure portions of said compressors, whereby said first compressor may be operated when said second compressor is at rest.

5. In a refrigerated automotive vehicle having transversely spaced and longitudinally extending chassis frame members, and a water cooling radiator disposed forwardly of a driving engine in the forward portion of a vehicle, the combination, comprising: refrigeration apparatus, including a first refrigerant compressor, a second refrigerant compressor, a receiver tank and fluid conducting conduits connected therebetween, supported on the chassis frame members proximate one end thereof and forwardly of the radiator; means, including a variable speed-ratio mechanism, for operatively connecting said first compressor with the vehicle engine for driving engagement therewith; said second compressor being of the hermetic-type with a self-contained electric driving motor adapted for operation, upon connection with a source of electric power supply, as a stand-by when said first compressor is inoperative; said fluid conducting conduits including a pair of conduits connecting together the high pressure portions and the low pressure portions, respectively, of said compressors; a one-way check valve adapted for installation in the conduit connecting the high pressure portions of said compressors, whereby said first compressor may be operated when said second compressor is at rest; and means for equalizing pressures in the high and low pressure portions of said hermetic compressor.

6. In a refrigerated automotive vehicle having transversely spaced and longitudinally extending chassis frame members, and a water cooling radiator disposed forwardly of a driving engine in the forward portion of a vehicle, the combination, comprising: refrigeration apparatus, including a first refrigerant compressor, a second refrigerant compressor, a receiver tank and fluid conducting conduits connected therebetween, supported on the chassis frame member proximate one end thereof and forwardly of the radiator; means, including a variable speed-ratio mechanism, for operatively connecting said first compressor with the vehicle engine for driving engagement therewith; said second compressor being of the hermetic-type with a self-contained electric driving motor adapted for operation, upon connection with a source of electric power supply, as a stand-by when said first compressor is inoperative; said fluid conducting conduits including a pair of conduits connecting together the high pressure portions and the low pressure portions, respectively, of said compressors; a one-way check valve adapted for installation in the conduit connecting the high pressure portions of said compressors, whereby said first compressor may be operated when said second compressor is at rest; and means, including a small diametered capillary tube connected therebetween, for equalizing pressure in the high and low pressure portions of said hermetic compressor.

7. In a refrigerated automotive vehicle having transversely spaced and longitudinally extending chassis frame members, and a water cooling radiator disposed forwardly of a driving engine in the forward portion of a vehicle, the combination, comprising: refrigeration apparatus, including a first refrigerant compressor, a second refrigerant compressor, a receiver tank and fluid conducting conduits connected therebetween, supported on the chassis frame members proximate one end thereof and forwardly of the radiator; means, including a variable speed-ratio mechanism, for operatively connecting said first compressor with the vehicle engine for driving engagement therewith; said second compressor being of the hermetic-type with a self-contained electric driving motor adapted for operation, upon connection with a source of electric power supply, as a stand-by when said first compressor is inoperative; said fluid conducting conduits including a pair of conduits connecting together the high pressure portions and the low pressure portions, respectively, of said compressors; a one-way check valve adapted for installation in the conduit connecting the high pressure portions of said compressors, whereby said first compressor may be operated when said second compressor is at rest; and a small diametered fluid conducting conduit having the ends thereof permanently connected into the fluid conducting conduits that respectively connect the high and low pressure portions of the hermetic compressor with other portions of the refrigeration apparatus.

8. The structure described in claim 7 further characterized by having one end of said small diametered fluid conducting conduit connected, at a point intermediate the check valve and high pressure portion of the hermetic compressor, into the conduit that joins the high pressure portions of the two compressors.

9. In a refrigerated automotive vehicle having transversely spaced and longitudinally extending chassis frame members, and a water cooling radiator disposed forwardly of a driving engine and its drive shaft in the forward portion of the vehicle, the combination, comprising: a base member disposed forwardly of the vehicle radiator and supported by the chassis frame members; a frame structure uprightly positioned on said base and disposed proximate the rearward edge of the base; refrigeration apparatus including, a refrigerant compressor and a receiver tank supportably mounted on said base forwardly of said upright frame, a refrigerant condenser positioned within said upright frame structure and disposed in spaced relation to said base and in close proximity to the vehicle radiator, and fluid conducting conduits connected therebetween; constant speed drive means operatively connecting said compressor with the drive shaft of the vehicle engine; said means including, a jackshaft disposed below said base member and extending fore and aft of the vehicle, a pulley on the aft end of said jackshaft and a belt connecting said pulley with the engine driveshaft, the fore end of said jackshaft extending forwardly of said base member and having a continuously adjustable-diameter pulley thereon, a complementary continuously adjustable-diameter pulley drivingly connected to said compressor, and a belt drivingly connecting said continuously adjustable-diameter pulleys together, whereby said compressor is drivingly operated at a substantially constant speed by the vehicle engine.

References Cited in the file of this patent

UNITED STATES PATENTS

| Number | Name | Date |
|---|---|---|
| 2,076,332 | Zercher | Apr. 6, 1937 |
| 2,180,760 | Mayo | Nov. 21, 1939 |
| 2,264,821 | Zukoski | Dec. 2, 1941 |
| 2,272,981 | Nelson | Feb. 10, 1942 |
| 2,336,089 | Gould | Dec. 7, 1943 |
| 2,361,855 | McCormack | Oct. 31, 1944 |
| 2,518,316 | Henney | Aug. 8, 1950 |
| 2,614,396 | Ratermann | Oct. 21, 1952 |

FOREIGN PATENTS

| Number | Country | Date |
|---|---|---|
| 741,080 | France | Feb. 6, 1933 |